(12) United States Patent
Singh et al.

(10) Patent No.: US 10,245,906 B2
(45) Date of Patent: Apr. 2, 2019

(54) TIRE WEAR COMPENSATED LOAD ESTIMATION SYSTEM AND METHOD

(71) Applicant: The Goodyear Tire & Rubber Company, Akron, OH (US)

(72) Inventors: Kanwar Bharat Singh, Stow, OH (US); Anthony William Parsons, Domeldange (LU); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 275 days.

(21) Appl. No.: 14/538,244

(22) Filed: Nov. 11, 2014

(65) Prior Publication Data

US 2016/0129737 A1    May 12, 2016

(51) Int. Cl.

| | |
|---|---|
| *B60W 40/13* | (2012.01) |
| *B60C 23/04* | (2006.01) |
| *B60C 23/06* | (2006.01) |
| *G01M 17/02* | (2006.01) |
| *B60C 11/24* | (2006.01) |
| *G01G 19/08* | (2006.01) |

(52) U.S. Cl.
CPC ........ *B60C 23/0488* (2013.01); *B60C 11/246* (2013.01); *B60C 23/04* (2013.01); *B60C 23/061* (2013.01); *B60C 23/064* (2013.01); *B60W 40/13* (2013.01); *G01G 19/086* (2013.01); *G01M 17/02* (2013.01)

(58) Field of Classification Search
None
See application file for complete search history.

(56) References Cited

U.S. PATENT DOCUMENTS

| 4,724,703 A * | 2/1988 | Neugebauer | G01M 17/02 73/146 |
|---|---|---|---|
| 6,278,361 B1 * | 8/2001 | Magiawala | B60C 23/0408 340/438 |
| 6,539,295 B1 * | 3/2003 | Katzen | G01M 17/02 701/33.6 |
| 7,000,462 B2 * | 2/2006 | Hillenmayer | B60C 23/0488 73/146.5 |

(Continued)

FOREIGN PATENT DOCUMENTS

| EP | 2679411 A2 | 1/2014 |
|---|---|---|
| EP | 2777956 A2 | 9/2014 |

(Continued)

OTHER PUBLICATIONS

EPO Search Report received by Applicant on Mar. 14, 2016.

*Primary Examiner* — Jill E Culler
(74) *Attorney, Agent, or Firm* — Edward T. Kennedy (57) ABSTRACT

A system and method of estimating a load bearing on a vehicle tire includes an inflation pressure measuring sensor for measuring an inflation pressure level within a tire cavity; a contact patch length sensor measuring the rolling contact patch length of the tire; a tire rolling speed sensor measuring a rolling speed of the tire; and a tire wear state estimation calculator estimating a tire wear state of a tread of the tire. An artificial neural network estimates a tire load from the contact patch length, the inflation pressure level, and the tire rolling speed by utilizing as a compensation factor input the estimated tire wear state.

4 Claims, 9 Drawing Sheets

(56) References Cited

U.S. PATENT DOCUMENTS

| | | |
|---|---|---|
| 7,546,764 B2 | 6/2009 | Morinaga |
| 7,552,628 B2 | 6/2009 | Mancosu |
| 8,874,386 B2 | 10/2014 | Brusarosco et al. |
| 9,120,356 B2* | 9/2015 | Patel ................... B60C 23/04 |
| 2003/0058118 A1* | 3/2003 | Wilson ............... B60C 23/0423 |
| | | 340/679 |
| 2005/0072223 A1 | 4/2005 | Fennel et al. |
| 2005/0085987 A1 | 4/2005 | Yokota et al. |
| 2005/0150283 A1 | 7/2005 | Shick |
| 2008/0103659 A1 | 5/2008 | Mancosu |
| 2009/0055040 A1 | 2/2009 | Nagaya |
| 2011/0060500 A1 | 3/2011 | Irth et al. |
| 2011/0199201 A1 | 8/2011 | Brusarosco et al. |
| 2013/0211621 A1 | 8/2013 | Breuer et al. |
| 2014/0260585 A1* | 9/2014 | Singh ................. B60C 23/0488 |
| | | 73/146.3 |

FOREIGN PATENT DOCUMENTS

| | | |
|---|---|---|
| JP | 2011053027 A | 3/2011 |
| WO | WO2011054363 A1 | 5/2011 |

\* cited by examiner

| Effect on Patch Length | Sensitivity |
|---|---|
| Increasing Load — Increases | 0.5 inch increase/200lbs increase in load |
| Increasing Pressure — Decreases | 0.4 inch decrease/4psi increase in pressure |
| Increasing Speed — Decreases | 0.25 inch decrease/20 mph increase in tire speed |
| Decreasing Tread Depth — Decreases | 0.25 inch decrease/2.5mm decrease in tire tread depth |

Contact Patch Length=f (Load, Pressure, Speed, Tire Wear State)

TIRE WEAR COMPENSATED LOAD ESTIMATION SYSTEM AND METHOD

FIELD OF THE INVENTION

The invention relates generally to tire monitoring systems for collecting measured tire parameter data during vehicle operation and, more particularly, to systems for estimating vehicle tire loading through the use of neural network analysis based upon such measurements.

BACKGROUND OF THE INVENTION

Vehicle-mounted tires may be monitored by tire pressure monitoring systems (TPMS) which measure tire parameters such as cavity pressure during vehicle operation. Other factors such as tire loading are important considerations for vehicle operation and safety. It is accordingly desirable to achieve a system and method that dynamically measures tire loading during the operation of a vehicle for use by vehicle control systems such as braking and suspension.

SUMMARY OF THE INVENTION

In one aspect of the invention, a system and method of estimating a load bearing on a vehicle tire is provided. An inflation pressure measuring sensor attaches to the tire for measuring an inflation pressure level within the tire cavity; a contact patch length sensor attaches to the tire for measuring the contact patch length of the tire rolling against a ground surface carrying a tire load; a tire rolling speed sensor mounts to the vehicle for measuring a rolling speed of the tire; and a tire wear state estimation calculator estimates a tire wear state of a tread of the tire. A tire load calculator estimates a tire load from the contact patch length, the inflation pressure level, and the tire rolling speed; the tire load calculator in the estimation of the tire load operably utilizing as a compensation factor input the estimated tire wear state.

In another aspect, a hub acceleration sensor mounts to the vehicle for measuring a hub acceleration of a hub supporting the vehicle tire; with the tire wear state estimation calculator estimating the tire wear state from the hub acceleration.

According to a further aspect, the tire load calculator employed comprises an artificial neural network-based signal processor receiving as inputs the contact patch length, the inflation pressure level, the tire rolling speed, and the estimated tire wear state, the artificial neural network operably compensating the measured contact patch length by the tire wear state estimation.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
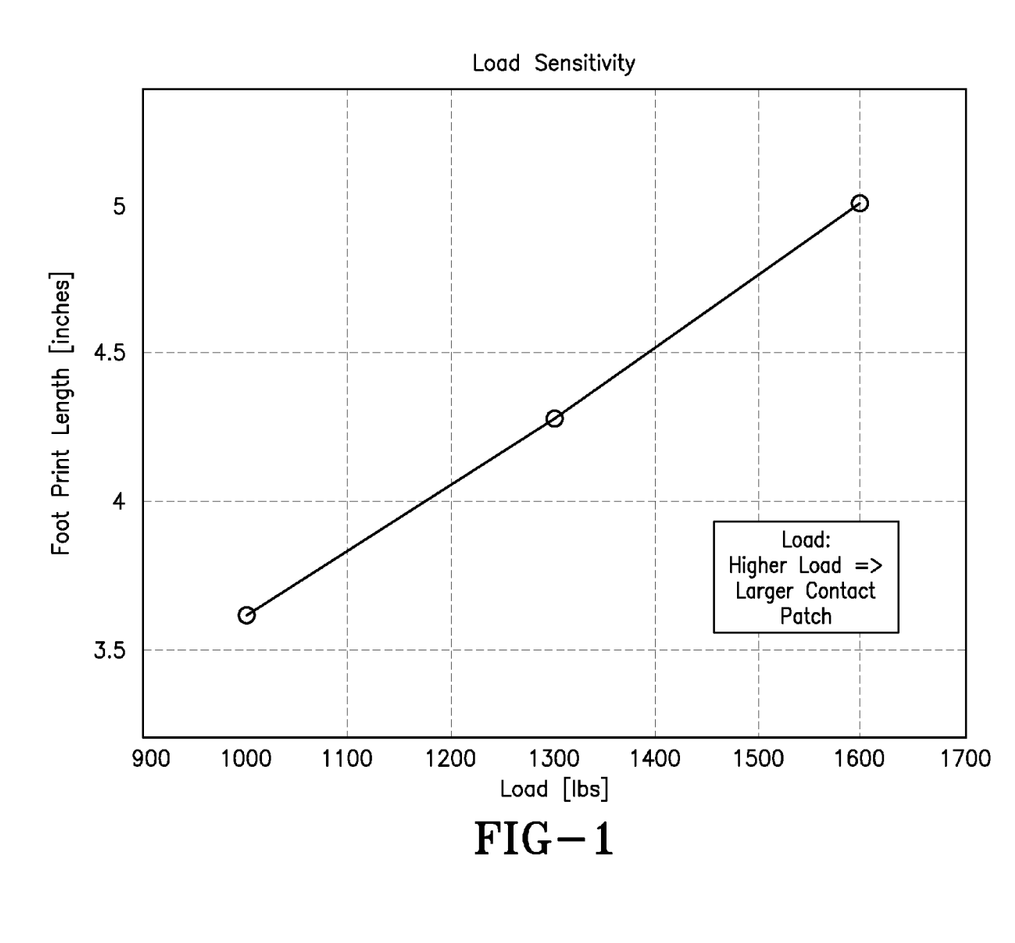
FIG. 1 is a graph illustrating the direct relationship between a tire footprint length and load.
Figure 2:
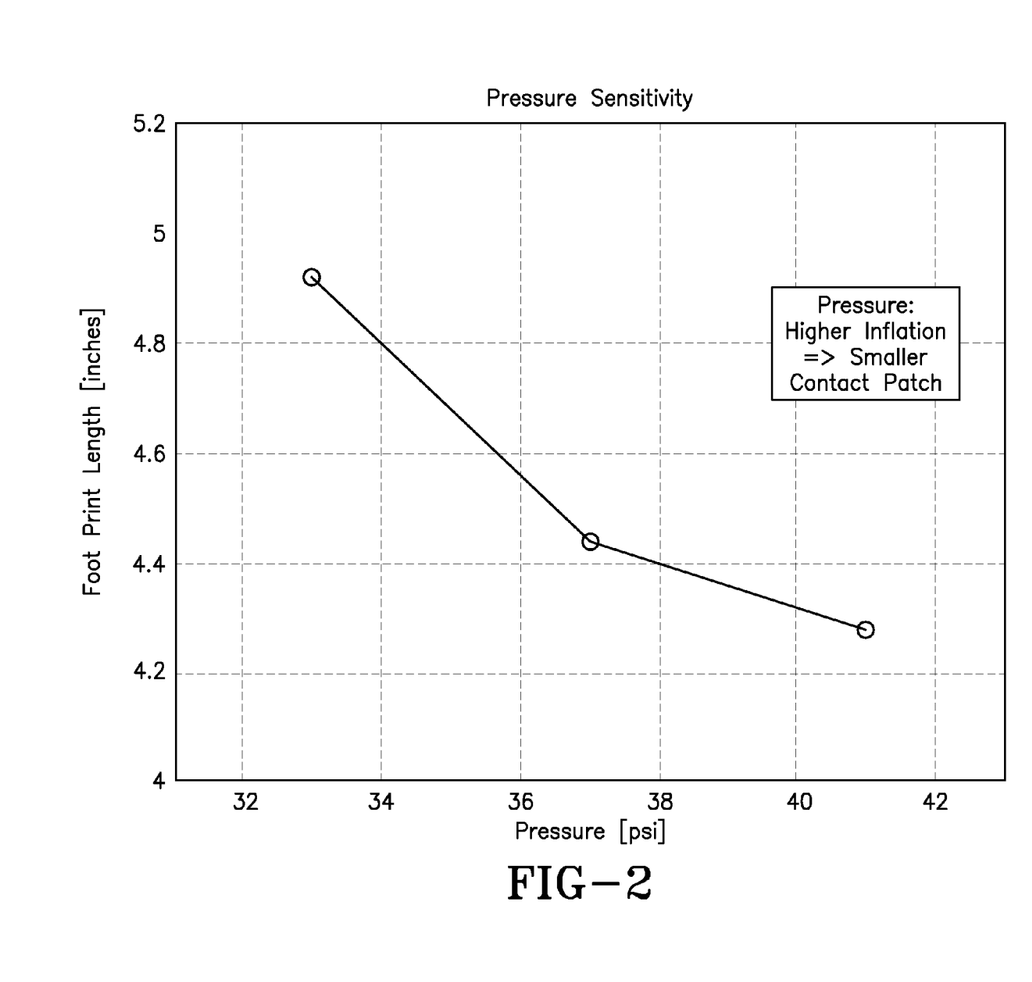
FIG. 2 is a graph illustrating the sensitivity of footprint length to air pressure within a tire cavity.
Figure 3:
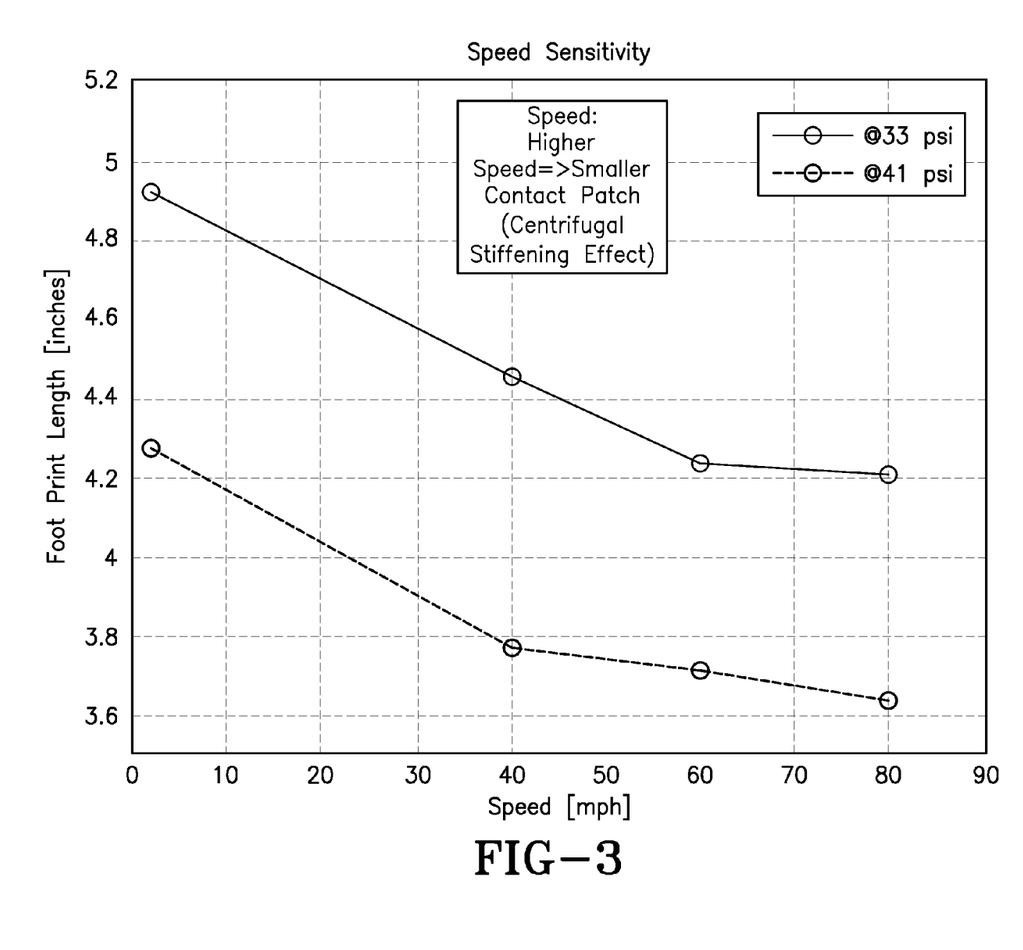
FIG. 3 is a graph illustrating the sensitivity of a footprint length to the speed of a tire for tire cavity air pressures of 33 and 41 psi.

Referring to FIG. 1, it is known and is reflected in the graph shown that the footprint length (inches) is directly proportional to the load carried by a vehicle tire. The greater the load, the larger the contact patch. Thus, by measuring the contact patch size, an estimation of the load carried by the tire may be made. Other factors, however, effect the accuracy of such an estimation. As shown in the FIG. 2 graph, the contact patch size is inversely related to the inflation pressure within the tire cavity. The higher inflation pressure within the cavity the smaller the contact patch created by the rolling tire against a ground surface. Speed of the vehicle and, accordingly, rotational speed of the tire is also a factor that inversely affects the size of the contact patch created by the tire as shown by the graph of FIG. 3. The effect of centrifugal stiffening causes a higher speed to result in a contact patch of smaller size. In FIG. 3, this effect is show for inflation pressures of 33 and 41 psi., illustrating that the combined effect of speed and inflation pressure must be considered as affecting contact patch size, and hence the estimation of load dependent upon measurement of contact patch.

Figure 4:
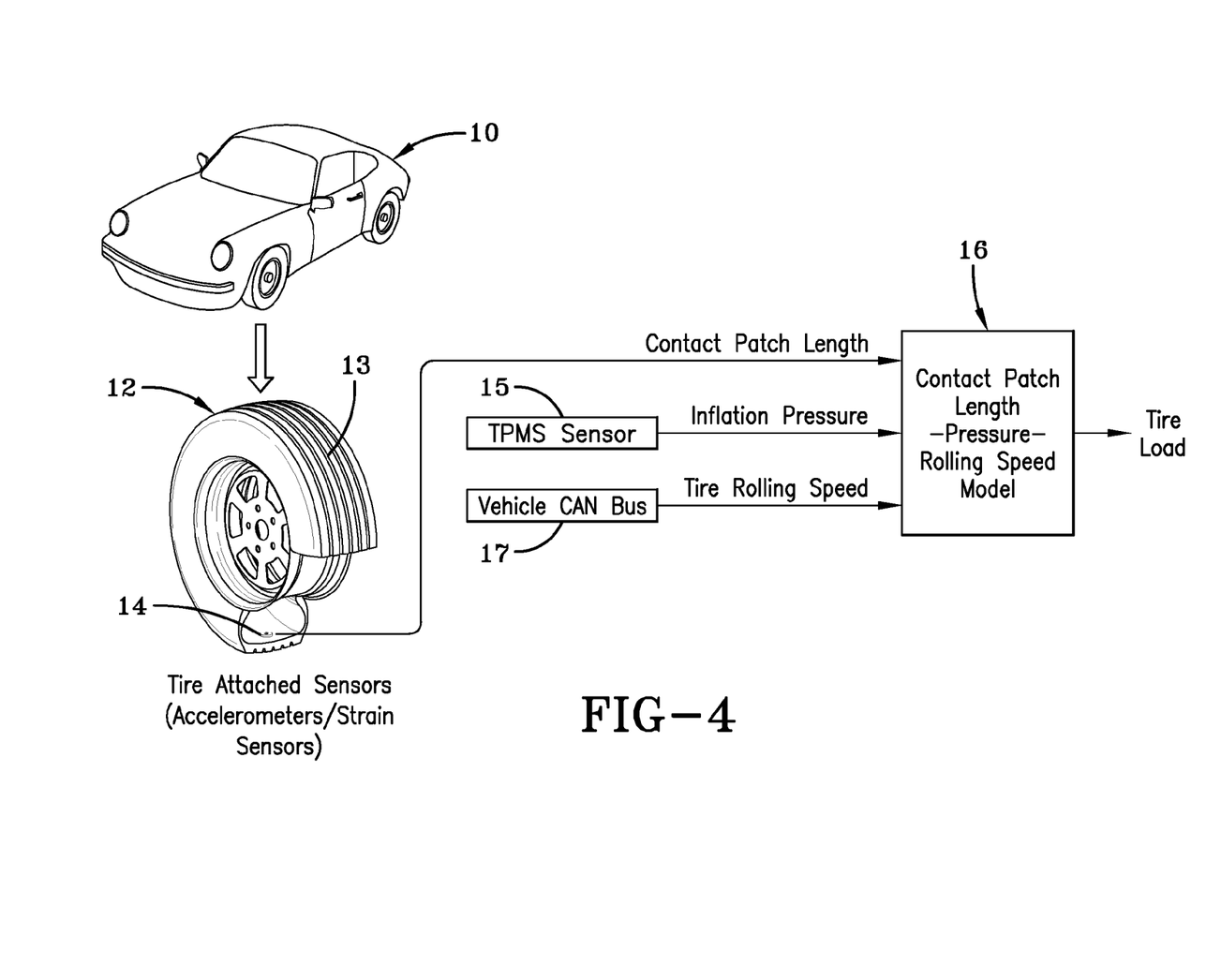
FIG. 4 is a diagrammatic representation of a system for estimating tire load from contact patch length, inflation pressure, and tire rolling speed, uncompensated by tire tread wear state.

A system for estimating load on a tire is shown in FIG. 4, referred to herein as "Load Estimation Without Tire-Wear Compensation". A vehicle 10 is carried by multiple tires 12, each tire 12 having an outer tread 13 that wears radially inward from use of the tire. The depth of the tread 13 thus decreases as the tire is worn away from road use. Mounted to the tire 13 are tire-attached sensors such as accelerometers/strain sensors 14 by which the contact patch length may be measured and signaled to a remote data processor 16. A TPMS (tire pressure monitoring system) sensor is another sensor mounted to the tire for the purpose of detecting air pressure level within the tire cavity and also provides identification data for the tire 12. Tire pressure and identification is transmitted from the TPMS sensor 15 to the processor 16. Vehicle-based speed sensors are conventionally deployed in vehicles such as vehicle 10 and provide by the Vehicle CAN Bus 17 tire rolling speed data to the processor 16. The sensors used in providing contact patch length, inflation pressure, and tire rolling speed are commercially available.

The processor 16 is programmed with a contact patch length-tire cavity pressure-rolling speed artificial neural network (ANN) model that conducts a non-linear statistical data analysis of the patch length, inflation pressure and tire rolling speed in order to estimate the tire loading that must be present in view of the input values. The ANN used in processor 16 changes its structure based on external information on contact length, inflation pressure, tire rolling speed that flows through the network during a learning phase. The ANN neural network is thus a non-linear statistical data modeling tool used to model complex relationships between the contact length, inflation pressure, rolling speed inputs and outputs in order to find patterns in data. The tire load estimation resulting from the ANN processing the indicated inputs may be used to adjust other vehicle systems such as braking, suspension and/or steering.

Figure 5:
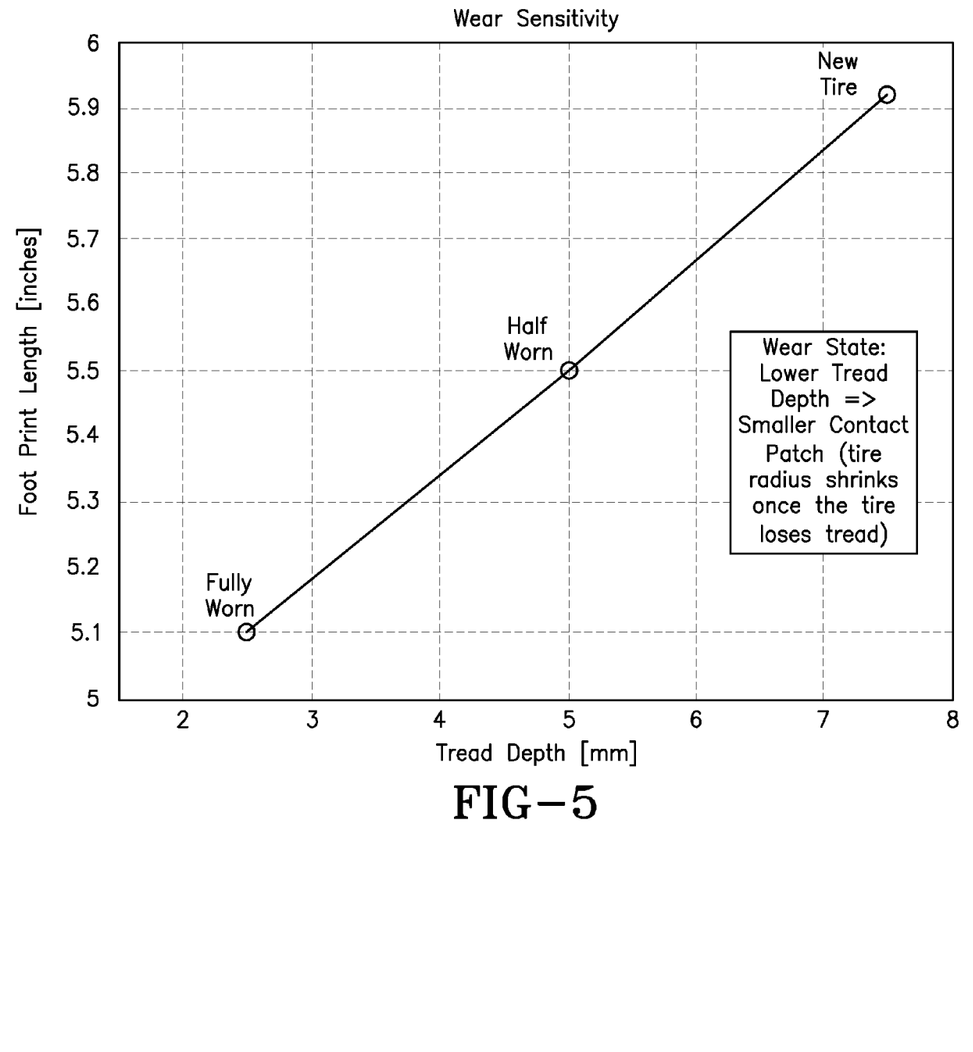
FIG. 5 is a graph illustrating the sensitivity of a footprint length to the tire tread wear state.

While the above system and method of FIG. 4 works well, its accuracy may become affected negatively as the tire under analysis becomes worn through use. In FIG. 5, the graph shows that footprint length (inches) is directly proportional to tread depth (mm) of the tire 12. The wear state of the tire thus affects the footprint length, with lower tread depth creating a smaller contact patch. As the tire wears, the radius of the tire shrinks once the tire loses tread, causing the contact patch to decrease in size. The graph of FIG. 5 shows the data points for a new tire (full tread depth); a half-worn tire, and a fully worn tire. Wear sensitivity of the measured contact length will thus affect the estimation of tire loading.

Figure 6:
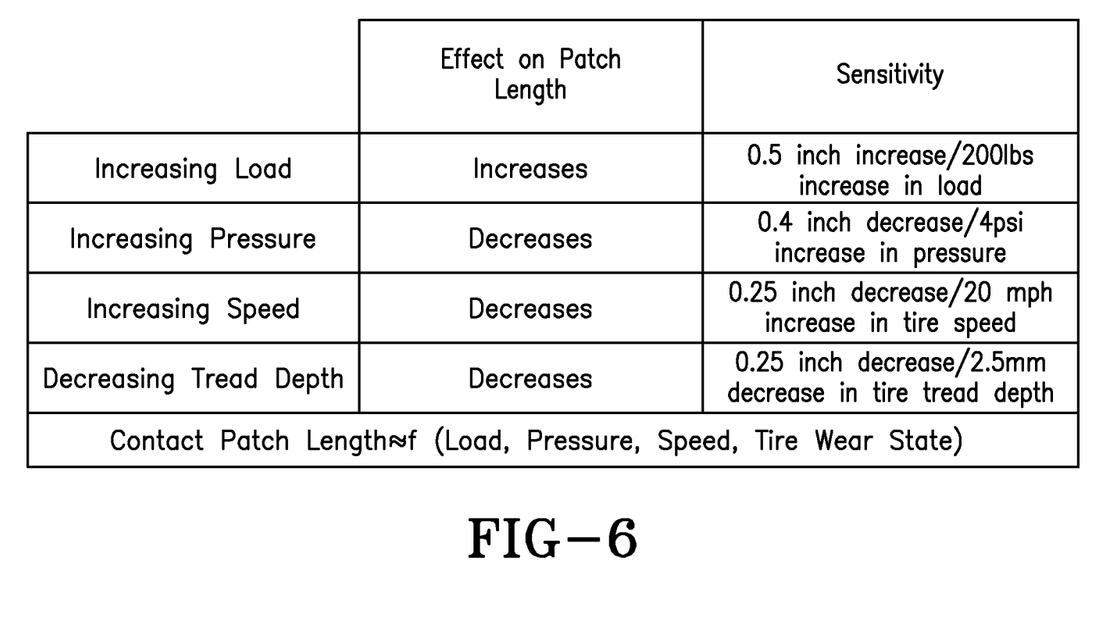
FIG. 6 is a table correlating the various factors effecting patch length and relative sensitivity.

FIG. 6 summarizes in tabular form the effects of increasing load, pressure and speed, and decreasing tread depth on patch length. The sensitivity of such changes to patch length change is further noted. From the tabled summary, it is noted that contact patch length is a function of load, pressure, speed and tire wear state. The subject invention to a load estimation system and method relying in part on contact patch length detection accordingly utilizes inputs of pressure, speed, tire wear state as well as contact patch length.

Figure 7:
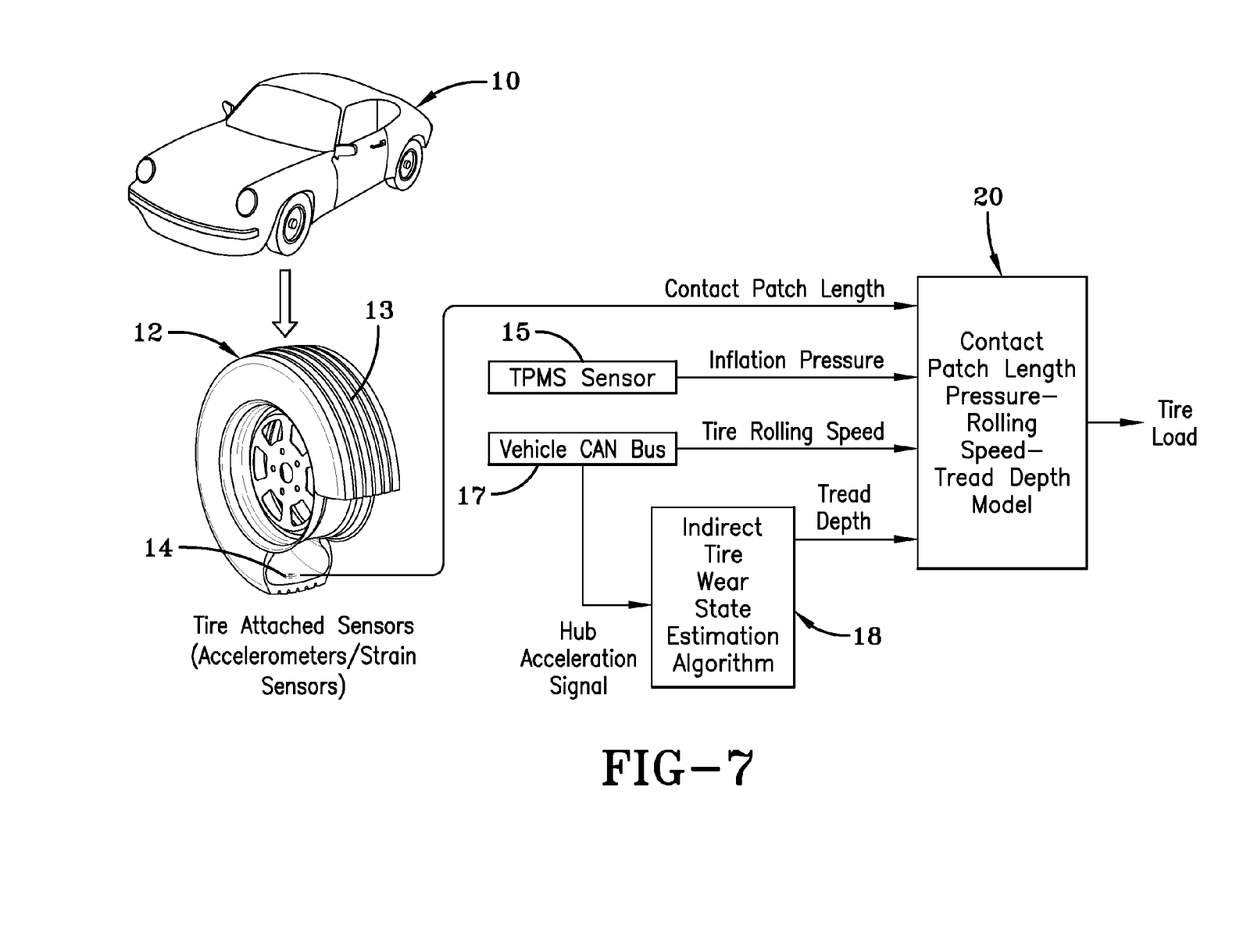
FIG. 7 is a diagrammatic representation of a system for estimating tire load from contact patch length, inflation pressure, and tire rolling speed, compensated by a hub acceleration signal derived estimated tire tread wear state.

FIG. 7 schematically shows the subject compensated system for estimating tire load. The contact patch length is derived from tire attached sensors 14 and inputs into the processor 20 programmed for ANN analysis. Likewise inflation pressure from tire-mounted TPMS sensor(s) 15 and tire rolling speed from vehicle-based CAN Bus sensors are inputs into the ANN network. An additional input, tread depth, is further provided as a compensatory input into the ANN network by which contact patch length is compensated for tread depth reduction in the tire tread. The tread depth is derived indirectly pursuant to a tire wear state estimation algorithm taught and disclosed by co-pending U.S. application Ser. No. 13/917,691 filed Jun. 14, 2013, and hereby incorporated by reference in its entirety herein. The indirect tire wear state estimation algorithm is used to generate tread depth estimation indirectly; that is, without the use of tire mounted tread depth measuring sensors. As such the difficulty of implementing and maintaining accurate tire-based sensor tread depth measurement is avoided. The indirect tire wear state estimation algorithm 18 is based upon the hub acceleration signal which is accessible via the vehicle CAN bus from vehicle based sensors. The hub acceleration signal is analyzed and an estimation is made as to the tread depth which, in turn, is reflective of the tire effective radius. The tread depth estimation made from the model 18 is input into the ANN programmed processor 20 and is operably utilized to account for the contact patch length-dependency on the state of tread depth. The contact patch length is thus compensated within the ANN by the tread depth of the tire tread 13 as well as the inflation pressure and rolling speed inputs.

Figure 8:
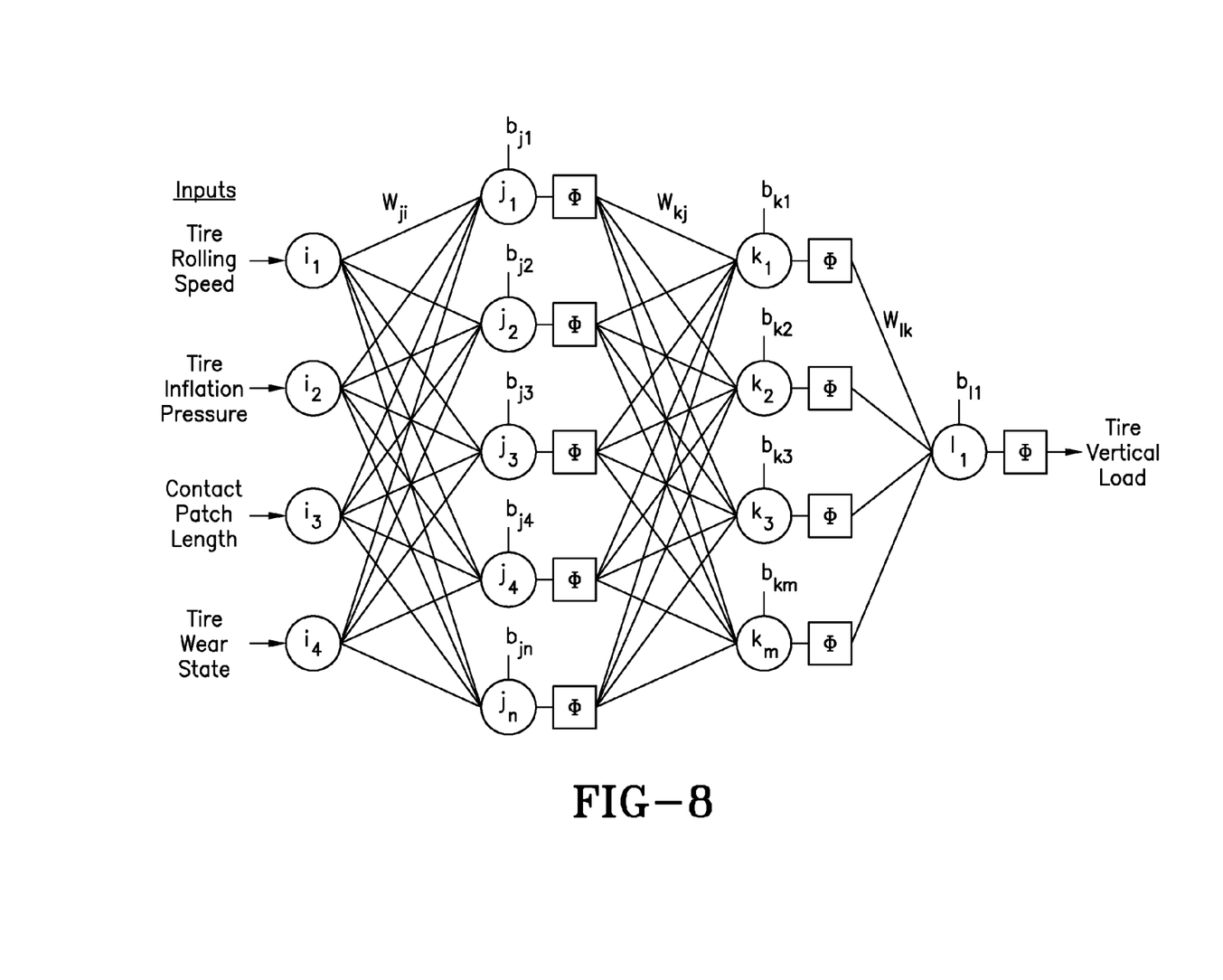
FIG. 8 is a schematic representation of an ANN having as inputs the tire rolling speed, the tire inflation pressure, the contact patch length, and the tire wear state as a compensating factor
Figure 9:
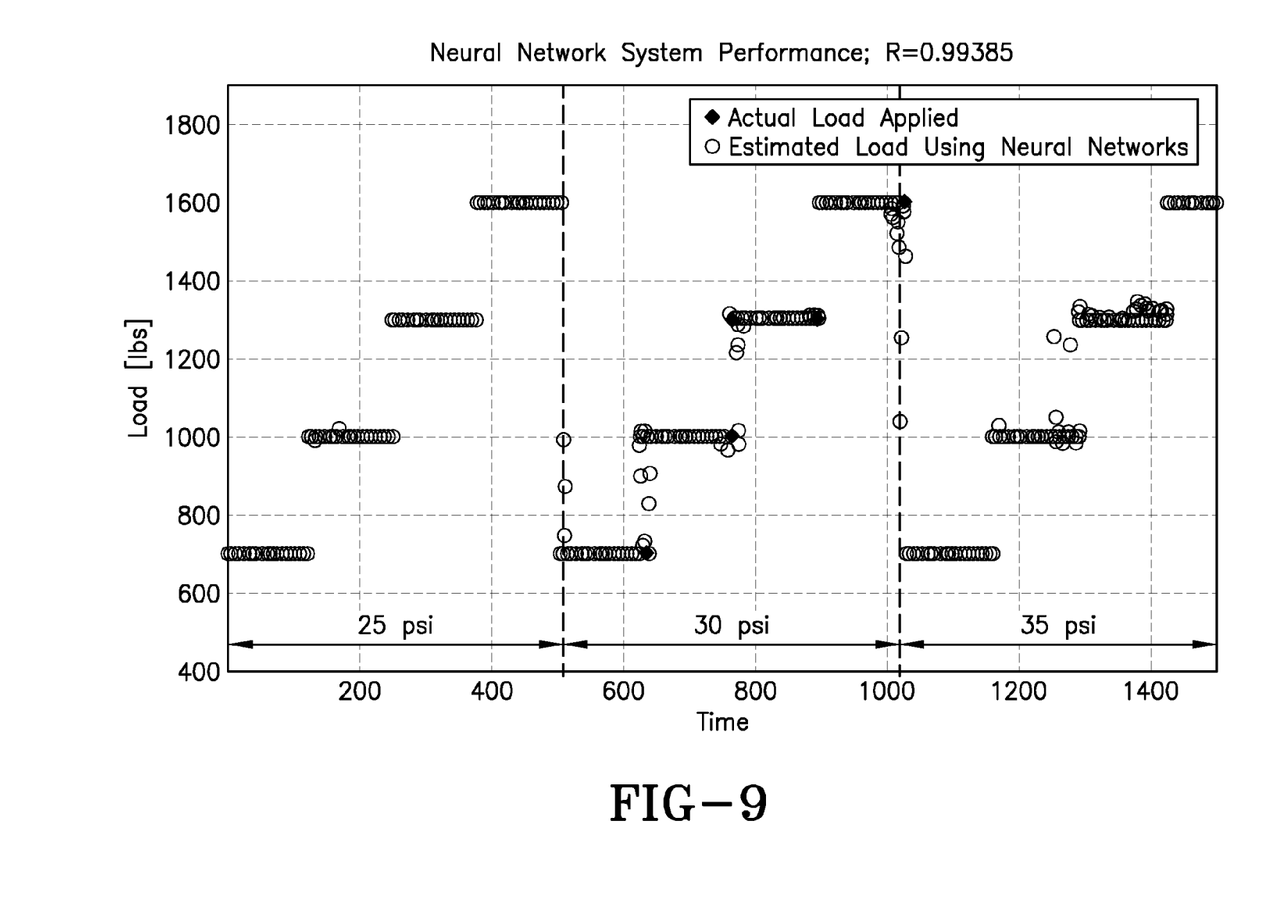
FIG. 9 is a graph of load vs. time demonstrating ANN system performance.

FIG. 8 shows diagrammatically the ANN network receiving as inputs the tire rolling speed, the tire inflation pressure, the contact patch length, and the compensatory tire wear state. The ANN operably processes the inputs to yield a tire vertical load estimation compensated by tire wear state. The compensation of tire patch length by tire wear state yields a high accuracy in load estimation as seen in experimental results of FIG. 9 graph. FIG. 9 shows actual load to estimated load using neural networks, plotting load over time at three pressure inflation levels of 25, 30, and 35 psi. The neural network system performance R=0.99385 was obtained, thus validating the use of tire wear state as a compensatory input to contact patch for improved model robustness and improved real-world accurate estimation results.

From the foregoing, it will be appreciated that a robust and accurate system and method of estimating a load bearing on a vehicle tire is achieved. An inflation pressure measuring sensor 15 attaches to the tire 12 for measuring an inflation pressure level within the tire cavity; a contact patch length sensor 14 attaches to the tire for measuring the contact patch length of the tire rolling against a ground surface carrying a tire load; a tire rolling speed sensor obtained from the vehicle CAN bus mounts to the vehicle for measuring a rolling speed of the tire; and a tire wear state estimation calculator 18 estimates a tire wear state of a tread 13 of the tire 12. A tire load calculator estimates a tire load from the contact patch length, the inflation pressure level, and the tire rolling speed; the tire load calculator in the estimation of the tire load operably utilizing as a compensation factor input the estimated tire wear state. A hub acceleration sensor mounts to the vehicle for measuring a hub acceleration of a hub supporting the vehicle tire; with the tire wear state estimation calculator estimating the tire wear state from the hub acceleration. The estimated tire load is achieved by a processor 20 that is ANN programmed to receive as inputs the contact patch length, the inflation pressure level, the tire rolling speed, and the estimated tire wear state, the artificial neural network operably compensating the measured contact patch length by the tire wear state estimation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A system of estimating a load bearing on a vehicle tire, comprising:
   a vehicle tire having a tire cavity and supporting a load;
   an inflation pressure measuring sensor attached to the tire for measuring an inflation pressure level within the tire cavity;
   a contact patch length sensor attached to the tire for measuring the contact patch length of the tire rolling against a ground surface carrying a tire load;
   a tire rolling speed sensor mounted to the vehicle for measuring a rolling speed of the tire;
   a hub acceleration sensor for measuring a hub acceleration of a hub supporting the vehicle tire;
   a tire wear state estimation calculator for deriving an estimated depth of a tread of the tire based on the hub acceleration;
   a compensation factor based upon the estimated depth of the tread; and
   a tire load calculator for estimating a tire load from the contact patch length, the compensation factor, the inflation pressure level, and the tire rolling speed.

2. The system of claim 1, wherein the tire load calculator comprises an artificial neural network-based signal processor receiving as inputs the contact patch length, the inflation pressure level, the tire rolling speed, and the estimated tire tread depth.

3. A method of estimating a load bearing on a vehicle tire having a tire cavity and supporting a load, comprising:
   attaching an inflation pressure measuring sensor to the tire for measuring an inflation pressure level within the tire cavity;
   attaching a contact patch length sensor to the tire for measuring the contact patch length of the tire rolling against a ground surface carrying the tire load;
   mounting a tire rolling speed sensor to the vehicle for measuring a rolling speed of the tire;
   measuring a hub acceleration of a hub supporting the vehicle tire;
   deriving an estimated depth of a tread of the tire based on the hub acceleration;
   basing a compensation factor upon the estimated depth of the tread; and
   estimating a tire load from the contact patch length, the compensation factor, the inflation pressure level, and the tire rolling speed.

4. The method of claim 3, further comprising employing an artificial neural network-based signal processor in estimating the tire load, the artificial neural network receiving as inputs the contact patch length, the inflation pressure level, the tire rolling speed, and the estimated tire tread depth.

* * * * *